United States Patent
Taniguchi et al.

(10) Patent No.: US 12,297,888 B2
(45) Date of Patent: May 13, 2025

(54) REINFORCING VIBRATION-DAMPING MATERIAL AND REINFORCING VIBRATION-DAMPING STRUCTURE

(71) Applicant: NITTO DENKO CORPORATION, Osaka (JP)

(72) Inventors: Shinichi Taniguchi, Osaka (JP); Terry Somers, Osaka (JP); George Rice, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 390 days.

(21) Appl. No.: 17/791,414

(22) PCT Filed: Oct. 15, 2020

(86) PCT No.: PCT/JP2020/038964
§ 371 (c)(1),
(2) Date: Jul. 7, 2022

(87) PCT Pub. No.: WO2021/140719
PCT Pub. Date: Jul. 15, 2021

(65) Prior Publication Data
US 2023/0062802 A1    Mar. 2, 2023

(30) Foreign Application Priority Data

Jan. 10, 2020    (JP) .................................. 2020-003127

(51) Int. Cl.
*F16F 1/02*    (2006.01)
*B32B 3/10*    (2006.01)
(Continued)

(52) U.S. Cl.
CPC ................ *F16F 7/121* (2013.01); *B32B 3/10* (2013.01); *B32B 5/18* (2013.01); *B32B 7/12* (2013.01);
(Continued)

(58) Field of Classification Search
CPC .......... F16F 1/027; F16F 1/182; F16F 1/3605; F16F 3/12; F16F 7/121; F16F 2224/025;
(Continued)

(56) References Cited

U.S. PATENT DOCUMENTS 3,160,549 A    12/1964    Caldwell et al.
3,514,165 A  *  5/1970   Marsh ....................... F16F 1/40
                                                              14/73.5

(Continued)

FOREIGN PATENT DOCUMENTS

CN    106085294 B    6/2018
JP    S59-068605 U    5/1984
(Continued)

OTHER PUBLICATIONS

Extended European Search Report issued by the European Patent Office on Dec. 1, 2023, in connection with European Patent Application No. 20912144.1.

(Continued)

*Primary Examiner* — Thomas J Williams
(74) *Attorney, Agent, or Firm* — Edwards Neils LLC; Jean C. Edwards, Esq.

(57) ABSTRACT

A reinforcing vibration-damping material that includes a reinforcing material and a vibration-damping material disposed on the reinforcing material in a thickness direction of the reinforcing material. The vibration-damping material has a first portion that overlaps the reinforcing material in the thickness direction and a second portion that does not overlap the reinforcing material in the thickness direction. When the reinforcing vibration-damping material is attached to the object, the reinforcing material is adhered to the object and the second portion of the vibration-damping material is (Continued)

also adhered to the object so that the vibration-damping material suppresses the downward displacement of the reinforcing material.

8 Claims, 6 Drawing Sheets

(51) Int. Cl.
| | | |
|---|---|---|
| B32B 5/18 | (2006.01) | |
| B32B 7/12 | (2006.01) | |
| B32B 25/08 | (2006.01) | |
| B32B 25/18 | (2006.01) | |
| F16F 1/36 | (2006.01) | |
| F16F 1/40 | (2006.01) | |
| F16F 3/087 | (2006.01) | |
| F16F 3/12 | (2006.01) | |
| F16F 7/12 | (2006.01) | |

(52) U.S. Cl.
CPC ............. *B32B 25/08* (2013.01); *B32B 25/18* (2013.01); *F16F 1/027* (2013.01); *F16F 1/3605* (2013.01); *F16F 1/40* (2013.01); *F16F 3/087* (2013.01); *F16F 3/12* (2013.01); *B32B 2250/02* (2013.01); *B32B 2250/24* (2013.01); *B32B 2266/0214* (2013.01); *B32B 2307/56* (2013.01); *B32B 2307/732* (2013.01); *B32B 2571/00* (2013.01); *F16F 2224/025* (2013.01)

(58) Field of Classification Search
CPC ..... F16F 1/40; B32B 3/10; B32B 5/18; B32B 7/12; B32B 25/08; B32B 25/18; B32B 2250/02; B32B 2250/24; B32B 2266/0214; B32B 2307/56; B32B 2307/732; B32B 2571/00
USPC .................................................. 267/158, 160
See application file for complete search history.

(56) References Cited

U.S. PATENT DOCUMENTS

| | | | | | |
|---|---|---|---|---|---|
| 3,873,077 | A | * | 3/1975 | Jorn .......................... | F16F 1/26 |
| | | | | | 267/152 |
| 5,232,073 | A | * | 8/1993 | Bronowicki .............. | B32B 3/14 |
| | | | | | 267/141.1 |
| 5,507,477 | A | * | 4/1996 | Manning .................. | F16F 3/093 |
| | | | | | 428/113 |
| 5,705,769 | A | * | 1/1998 | Hanson .................... | B32B 15/08 |
| | | | | | 181/290 |
| 5,946,866 | A | * | 9/1999 | Weglewski ............... | F16F 1/40 |
| | | | | | 52/167.7 |
| 9,527,370 | B2 | | 12/2016 | Scott et al. | |
| 11,701,863 | B2 | * | 7/2023 | Milliman .................. | B32B 3/18 |
| | | | | | 428/201 |
| 2010/0256302 | A1 | | 10/2010 | Matsumoto et al. | |
| 2012/0193180 | A1 | | 8/2012 | Kawaguchi | |
| 2023/0062802 | A1 | * | 3/2023 | Taniguchi ............... | B32B 27/18 |

FOREIGN PATENT DOCUMENTS

| | | | |
|---|---|---|---|
| JP | 07-137208 | A | 5/1995 |
| JP | H07-139584 | A | 5/1995 |
| JP | 09-189340 | A | 7/1997 |
| JP | 2009-067825 | A | 4/2009 |
| JP | 2009-161659 | A | 7/2009 |
| JP | 2011-089547 | A | 5/2011 |
| JP | 2015-205451 | A | 11/2015 |
| JP | 2016-074803 | A | 5/2016 |
| WO | 2019/099363 | A1 | 5/2019 |

OTHER PUBLICATIONS

International Preliminary Report on Patentability issued by WIPO on Jul. 12, 2022, in connection with International Patent Application No. PCT/JP2020/038964.
International Search Report issued in PCT/JP2020/038964 on Nov. 10, 2020.
Written Opinion issued in PCT/JP2020/038964 on Nov. 10, 2020.

* cited by examiner

REINFORCING VIBRATION-DAMPING MATERIAL AND REINFORCING VIBRATION-DAMPING STRUCTURE

CROSS-REFERENCE TO RELATED APPLICATIONS

The present application is a 35 U.S.C. 371 National Stage Entry of PCT/JP2020/038964, filed on Oct. 15, 2020, which claims priority from Japanese Patent Application No. 2020-003127, filed on Jan. 10, 2020, the contents of all of which are herein incorporated by reference in their entirety.

TECHNICAL FIELD

The present invention relates to a reinforcing vibration-damping material and a reinforcing vibration-damping structure.

BACKGROUND ART

A vibration-damping reinforcing sheet, which includes a vibration-damping reinforcement layer containing a butyl rubber, an acrylonitrile-butadiene rubber, an epoxy resin, and an epoxy resin curing agent, has been proposed (for example, see Patent document 1 below).

CITATION LIST

Patent Document

Patent Document 1: Japanese Unexamined Patent Publication No. 2009-161659

SUMMARY OF THE INVENTION

Problem to be Solved by the Invention

Such a vibration-damping reinforcing material as described in Patent Document 1 may not sufficiently achieve reinforcement performance and vibration-damping performance.

In light of the foregoing, the present invention aims to provide a reinforcing vibration-damping material and a reinforcing vibration-damping structure, both of which can improve both of the reinforcement performance and vibration-damping performance and can suppress the downward displacement of the reinforcing vibration-damping material.

Means for Solving the Problem

The present invention includes a reinforcing vibration-damping material comprising: a reinforcing material; and a vibration-damping material disposed on the reinforcing material in a thickness direction of the reinforcing material, wherein the vibration-damping material has a first portion that overlaps the reinforcing material in the thickness direction, and a second portion that does not overlap the reinforcing material in the thickness direction.

Such a structure allows for the suppression of the vibration of the object with the vibration-damping material and the reinforcement of the object with the reinforcing material reinforces.

Thus, both of the reinforcement performance and vibration-damping performance can be improved.

When the reinforcing vibration-damping material is attached to the object, the reinforcing material is adhered to the object and simultaneously the second portion of the vibration-damping material can also be adhered to the object.

Thus, the vibration-damping material can suppress the downward displacement of the reinforcing material.

As a result, the downward displacement of the reinforcing vibration-damping material is suppressed and consequently the reinforcing vibration-damping material can be maintained at a desired location.

The present invention includes the reinforcing vibration-damping material described above, wherein the second portion protrudes beyond an edge of the reinforcing material in a direction orthogonal to the thickness direction.

Such a structure facilitates the adherence of the second portion of the vibration-damping material to the object.

The present invention includes the reinforcing vibration-damping material described above, wherein the reinforcing material has a first resin layer and a first constraining layer disposed on the first resin layer in the thickness direction, and the vibration-damping material has a second resin layer disposed on the first constraining layer in the thickness direction and a second constraining layer disposed on the second resin layer in the thickness direction.

By such a structure, the first constraining layer can constrain the first resin layer and the second constraining layer can constrain the second resin layer.

These constraints can improve the handleability of the reinforcing vibration-damping material by maintaining the shapes of the first resin layer and second resin layer.

The present invention includes the reinforcing vibration-damping material described above, wherein the first resin layer contains a thermosetting resin, and the second resin layer contains a butyl rubber.

The present invention includes the reinforcing vibration-damping material described above, wherein the first resin layer further contains a foaming agent.

The present invention includes a reinforcing vibration-damping structure comprising: an object; a reinforcement member disposed on the object and reinforcing the object; and a vibration-damping member disposed on the reinforcement member in a thickness direction of the reinforcement member to suppress vibration of the object, wherein the vibration-damping member has a first portion that overlaps the reinforcement member in the thickness direction and a second portion that does not overlap the reinforcement member in the thickness direction and is disposed on the object in the thickness direction.

Such a structure includes the reinforcement member disposed on the object and the vibration-damping member disposed on the reinforcement member, and thus can suppress the vibration of the object with the vibration-damping member while reinforcing the object with the reinforcement member.

As a result, both of the reinforcement performance and the vibration-damping performance can be improved.

Further, the reinforcement member is disposed on the object and the second portion of the vibration-damping member is also disposed on the object.

Thus, the reinforcement member is attached to the object while the vibration-damping member suppresses the downward displacement of the reinforcement member. This can maintain the reinforcement member and the vibration-damping member at desired locations.

As a result, the reinforcement member and the vibration-damping member are accurately disposed at parts of the object that require reinforcement and vibration-damping.

Consequently, both of the reinforcement performance and the vibration-damping performance can further be improved.

The present invention includes the reinforcing vibration-damping structure described above, wherein the object has a surface extending in a vertical direction, the reinforcement member is disposed on the surface of the object in the thickness direction orthogonal to the vertical direction, and the second portion protrudes upward beyond an upper edge of the reinforcement member in the vertical direction.

Such a structure provides a simple structure in which the second portion can suppress the downward displacement of the reinforcement member.

The present invention includes the reinforcing vibration-damping structure described above, wherein the object has a surface extending in a vertical direction, the reinforcement member is disposed on the surface of the object in the thickness direction orthogonal to the vertical direction, and the second portion protrudes beyond an edge of the reinforcement member in a width direction orthogonal to both of the vertical direction and the thickness direction.

Such a structure provides a simple structure in which the second portion can suppress the downward displacement of the reinforcement member.

The present invention includes the reinforcing vibration-damping structure described above, wherein the reinforcement member has a reinforcement layer disposed on the object in the thickness direction and a first constraining layer disposed on the reinforcement layer in the thickness direction, and the vibration-damping member has a vibration-damping layer disposed on the first constraining layer in the thickness direction and a second constraining layer disposed on the vibration-damping layer in the thickness direction.

Such a structure enables the first constraining layer to give toughness to the reinforcement layer, and thus can improve the reinforcement performance.

Further, the structure enables the second constraining layer to give toughness to the vibration-damping layer and can also improve the vibration-damping performance.

The present invention includes the reinforcing vibration-damping structure described above, wherein the reinforcement layer is a cured product of the first resin layer containing a thermosetting resin, and the vibration-damping layer is made of a second resin layer containing a butyl rubber.

The present invention includes the reinforcing vibration-damping structure described above, wherein the reinforcement layer is a foamed material.

Such a structure can improve the reinforcement performance by increasing the thickness of the reinforcement layer.

Effects of the Invention

The reinforcing vibration-damping material and reinforcing vibration-damping structure of the present invention can improve both of the reinforcement performance and the vibration-damping performance and can suppress the downward displacement of the reinforcing vibration-damping material.

BRIEF DESCRIPTION OF THE DRAWINGS

FIG. 3A illustrates an adhering step for making the reinforcing vibration-damping material adhering to the object. FIG. 3B illustrates a curing step for foaming and curing the first resin layer by heating the object to which the reinforcing vibration-damping material adheres.

DESCRIPTION OF THE EMBODIMENT

1. Reinforcing Vibration-Damping Material

Figure 1:
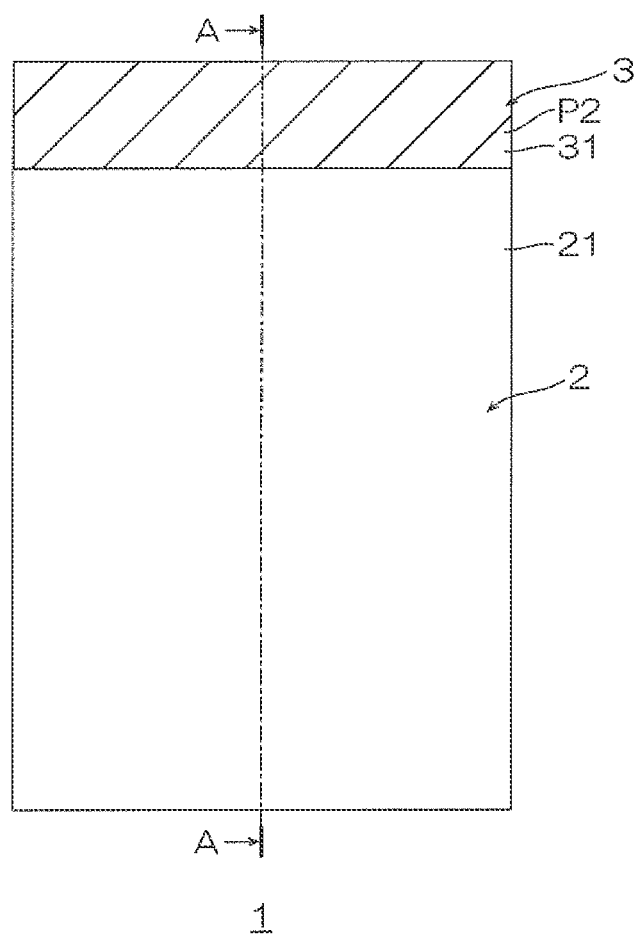
FIG. 1 is a plan view of a reinforcing vibration-damping material as one embodiment of the present invention, viewed from a reinforcing material side.

A reinforcing vibration-damping material 1 illustrated in FIG. 1 is a material for reinforcing an object P (see FIG. 3B) and damping the vibration of the object P.

The reinforcement performance of the reinforcing vibration-damping material 1 can be evaluated using the bending strength of the object P to which the reinforcing vibration-damping material 1 is attached as described below in Examples. When the bending strength is 30N or more according to the evaluation method described below, the reinforcing vibration-damping material 1 achieves reinforcement performance. The bending strength is preferably 40N or more.

The "vibration-damping" means that to suppress the vibration of the object P. The vibration-damping performance can be evaluated using the loss factor of a second resonance point at 20° C. of the object P to which the reinforcing vibration-damping material 1 is attached as described below in Examples. When the loss factor of a second resonance point at 20° C. is 0.1 or more according to the evaluation method described below, the reinforcing vibration-damping material 1 achieves vibration-damping performance. The loss factor of a second resonance point at 20° C. is preferably 0.2 or more, more preferably 0.3 or more.

Examples of the object P include metallic panels such as an aluminum plate, a stainless-steel plate, an iron plate, a copper plate, a zinc plate, and a brass plate. The metallic panel is used for, for example, transports such as automobiles, railway vehicles, vessels, and airplanes, or buildings. Preferably, the reinforcing vibration-damping material 1 is a reinforcing vibration-damping sheet.

Figure 2:
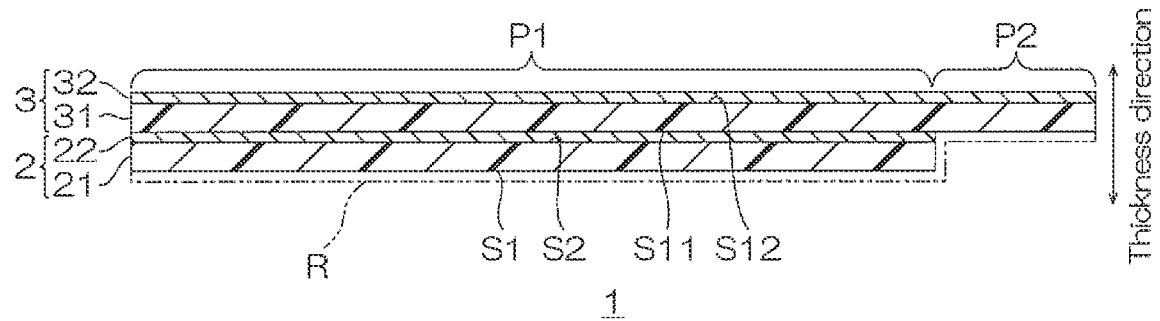
FIG. 2 is a cross-sectional view of the reinforcing vibration-damping material of FIG. 1, taken along line A-A.

As illustrated in FIG. 1 and FIG. 2, the reinforcing vibration-damping material 1 includes a reinforcing material 2 and a vibration-damping material 3. The reinforcing vibration-damping material 1, as necessary, includes a release sheet R (see the phantom line of FIG. 2).

(1) Reinforcing Material

The reinforcing material 2 is a material for reinforcing the object P. The reinforcing material 2 has a sheet shape. The reinforcing material 2 includes a first resin layer 21 and a first constraining layer 22.

(1-1) First Resin Layer

The first resin layer 21 has a predetermined thickness in a thickness direction of the reinforcing material 2. The first resin layer 21 has a first surface S1 and a second surface S2 in the thickness direction.

The first resin layer 21 has a thickness of, for example, 0.1 mm or more, preferably 0.2 mm or more, for example, 10 mm or less, preferably 5 mm or less.

The first resin layer 21 consists of a first resin composition containing a thermosetting resin. In addition to the above-described component, the first resin composition preferably contains a diene rubber, a tackifier resin, a vulcanizing agent, a vulcanization accelerator, a thermosetting resin curing agent, a foaming agent, and a filler. The first resin composition may contain a known additive (such as a pigment or a thixotropic agent) in addition to the above-described components.

(1-1-1) Thermosetting Resin

Examples of the thermosetting resin include epoxy resins.

Examples of the epoxy resin include aromatic epoxy resins such as bisphenol epoxy resins (such as bisphenol A epoxy resin, bisphenol F epoxy resin, and bisphenol S epoxy resin), novolak epoxy resins (such as phenol novolak epoxy resin and cresol novolak epoxy resin), naphthalene epoxy resin and biphenyl epoxy resin, alicyclic epoxy resins such as dicyclo ring-type epoxy resin and hydrogenated bisphenol A epoxy resin, nitrogen-containing cyclic epoxy resins such as triglycidyl isocyanurate, hydantoin epoxy resin, and triepoxypropyl isocyanurate resin, and flexible epoxy resins such as aliphatic modified epoxy resin, butadiene epoxy resin, ε-caprolactone-modified epoxy resin, thiol epoxy resin, rubber (such as NBR, carboxyl group-terminated NBR, or amino group-terminated NBR)-modified epoxy resin, dimer acid-modified epoxy resin, urethane-modified epoxy resin, polyol-modified epoxy resin, and amine-modified epoxy resin. The epoxy resins may be used in combination of two or more.

As the epoxy resin, preferably, a bisphenol epoxy resin and an alicyclic epoxy resin are used in combination, or a flexible epoxy resin is used alone.

The content of the thermosetting resin in the first resin layer 21 (first resin composition) is, for example, 10% by mass or more, preferably 20% by mass or more, more preferably 30% by mass or more, and, for example, 50% by mass or less, preferably 40% by mass or less.

(1-1-2) Diene Rubber

Examples of the diene rubber include styrene-butadiene rubber (SBR), acrylonitrile-butadiene rubber (NBR), isoprene rubber, and butadiene rubber.

As the diene rubber, preferably, SBR is used alone, or NBR and butadiene rubber are used in combination.

To 100 parts by mass of the thermosetting resin, a blending ratio of the diene rubber is, for example, 10 parts by mass or more, preferably 20 parts by mass or more, more preferably 40 parts by mass or more, and, for example, 500 parts by mass or less, preferably 300 parts by mass or less, more preferably 100 parts by mass or less.

(1-1-3) Tackifier Resin

The tackifier resin gives adhesion to the first resin layer 21.

Examples of the tackifier resin include natural resin-based tackifier resins and synthetic resin-based tackifier resins.

Examples of the natural resin-based tackifier resin include rosin resins such as rosin esters, and terpene resins such as aromatic modified terpene resins and terpene phenol resins.

Examples of the synthetic resin-based tackifier resin include aliphatic (C5) petroleum resins, aromatic (C9) petroleum resins, and aliphatic-aromatic copolymerized (C5/C9) petroleum resins.

As the tackifier resin, a synthetic resin-based tackifier resin is preferable, and an aliphatic-aromatic copolymerized petroleum resin is more preferable.

To 100 parts by mass of the thermosetting resin, a blending ratio of the tackifier resin is, for example, 20 parts by mass or more, preferably 40 parts by mass or more, and, for example, 80 parts by mass or less, preferably 70 parts by mass or less.

To 100 parts by mass of the diene rubber, a blending ratio of the tackifier resin is, for example, 50 parts by mass or more, preferably 80 parts by mass or more, and, for example, 200 parts by mass or less, preferably 150 parts by mass or less.

(1-1-4) Vulcanizing Agent

The vulcanizing agent forms crosslinks of the diene rubber (or vulcanizes the diene rubber) by heating.

Examples of the vulcanizing agent include sulfur, sulfur compounds, and organic peroxide.

Sulfur is preferable as the vulcanizing agent.

To 100 parts by mass of the thermosetting resin, a blending ratio of the vulcanizing agent is, for example, 1 part by mass or more, preferably 5 parts by mass or more, more preferably 10 parts by mass or more, and, for example, 60 parts by mass or less, preferably 20 parts by mass or less.

To 100 parts by mass of the diene rubber, a blending ratio of the vulcanizing agent is, for example, 2 parts by mass or more, preferably 10 parts by mass or more, more preferably 20 parts by mass or more, and, for example, 90 parts by mass or less, preferably 70 parts by mass or less, more preferably 50 parts by mass or less.

(1-1-5) Vulcanization Accelerator

The vulcanization accelerator promotes the vulcanization of the vulcanizing agent.

Examples of the vulcanization accelerator include thiazole vulcanization accelerators, thiourea vulcanization accelerators, thiuram vulcanization accelerators, dithiocarbamate vulcanization accelerators, guanidine vulcanization accelerators, aldehyde-ammonia vulcanization accelerators, and sulfenamide vulcanization accelerators.

As the vulcanization accelerator, a thiazole vulcanization accelerator is preferable.

To 100 parts by mass of the thermosetting resin, a blending ratio of the vulcanization accelerator is, for example, 1 part by mass or more, preferably 3 parts by mass or more, more preferably 5 parts by mass or more, and, for example, 20 parts by mass or less, preferably 10 parts by mass or less.

To 100 parts by mass of the vulcanizing agent, a blending ratio of the vulcanization accelerator is, for example, 10 parts by mass or more, preferably 20 parts by mass or more, and, for example, 100 parts by mass or less, preferably 70 parts by mass or less.

(1-1-6) Thermosetting Resin Curing Agent

The thermosetting resin curing agent promotes the curing of the thermosetting resin.

Examples of the thermosetting resin curing agent include cyanamide, amine, acid anhydride, amide, hydrazide, imidazole, and imidazoline.

Examples of the cyanamide include dicyandiamide.

Examples of the amine include ethylenediamine, propylenediamine, diethylenetriamine, triethylenetetramine, and amine adduct thereof, methaphenylenediamine, diaminodiphenyl methane, and diaminodiphenyl sulfone.

Examples of the acid anhydride include phthalic anhydride, maleic anhydride, tetrahydrophthalic anhydride, hexahydrophthalic anhydride, methyl nadic anhydride, pyromellitic acid anhydride, dodecenyl succinic anhydride, dichloro succinic anhydride, benzophenone tetracarboxylic anhydride, and chlorendic anhydride.

Examples of the amide include polyamide.

Examples of the hydrazide include dihydrazide.

Examples of the imidazole include methylimidazole, 2-ethyl-4-methylimidazole, ethylimidazole, isopropylimidazole, 2,4-dimethylimidazole, phenylimidazole, undecylimidazole, heptadecylimidazole, and 2-phenyl-4-methylimidazole.

Examples of the imidazoline include methylimidazoline, 2-ethyl-4-methylimidazoline, ethylimidazoline, isopropylimidazoline, 2,4-dimethylimidazoline, phenylimidazoline, undecylimidazoline, heptadecylimidazoline, and 2-phenyl-4-methylimidazoline.

As the thermosetting resin curing agent, cyanamide is preferable.

To 100 parts by mass of the thermosetting resin, a blending ratio of the thermosetting resin curing agent is, for example, 1 part by mass or more, preferably 2 parts by mass or more, and, for example, 10 parts by mass or less, preferably 5 parts by mass or less.

(1-1-7) Foaming Agent

The foaming agent foams by heating. The first resin layer 21 containing the foaming agent can increase the thickness of the reinforcement layer 41 described below and improve the strength of the reinforcement member 4.

Examples of the foaming agent include inorganic foaming agents and organic foaming agents.

Examples of the inorganic foaming agent include ammonium carbonate, ammonium hydrogen carbonate, sodium hydrogen carbonate, ammonium nitrite, sodium borohydride, and azides.

Examples of the organic foaming agent include N-nitroso compounds such as N,N'-dinitrosopentamethylenetetramine, azo compounds such as azobisisobutyronitrile, alkane fluorides such as trichloromonofluoromethane, hydrazine compounds such as 4,4'-oxybis (benzene sulfonyl hydrazide) and allylbis (sulfonyl hydrazide), semicarbazide compounds such as p-toluylenesulfonyl semicarbazide, and triazole compounds such as 5-morpholinyl-1, 2, 3, 4-thiatriazole.

As the foaming agent, an organic foaming agent is preferable, and 4,4'-oxybis (benzene sulfonyl hydrazide) is more preferable.

To 100 parts by mass of the thermosetting resin, a blending ratio of the foaming agent is, for example, 0.1 parts by mass or more, preferably 0.5 parts by mass or more, and, for example, 20 parts by mass or less, preferably 5 parts by mass or less.

To 100 parts by mass of the total of the thermosetting resin, the diene rubber, and the tackifier resin, a blending ratio of the foaming agent is, for example, 0.2 parts by mass or more, preferably 1 part by mass or more, and, for example, 40 parts by mass or less, preferably 10 parts by mass or less.

(1-1-8) Filler

Examples of the filler include calcium carbonate such as heavy calcium carbonate and light calcium carbonate, carbon black such as acetylene black and furnace black, minerals such as talc, mica, clay, and bentonite, oxides such as silicon oxide (silica), aluminum oxide (alumina), and titanium oxide, silicates such as aluminum silicate, metals such as aluminum and iron, resins such as acrylic resin and styrene resin, hydroxides such as aluminum hydroxide and magnesium hydroxide, and nitrides such as boron nitride.

As the filler, preferably, calcium carbonate is used alone, or calcium carbonate and carbon black are used in combination, and, more preferably, heavy calcium carbonate is used alone, or heavy calcium carbonate and carbon black are used in combination.

To 100 parts by mass of the thermosetting resin, a blending ratio of the filler is, for example, 10 parts by mass or more, preferably 30 parts by mass or more, and, for example, 200 parts by mass or less, preferably 100 parts by mass or less, more preferably 70 parts by mass or less.

(1-2) First Constraining Layer

The first constraining layer 22 is disposed on the second surface S2 of the first resin layer 21 in the thickness direction. The first constraining layer 22 constrains a reinforcement layer 41 described below (see FIG. 3B). The first constraining layer 22 constrains the reinforcement layer 41, thereby improving the toughness of the reinforcement layer 41. The first constraining layer 22 has a predetermined thickness in the thickness direction.

The first constraining layer 22 has a thickness of, for example, 0.01 mm or more, preferably 0.05 mm or more, and, for example, 3 mm or less, preferably 1 mm or less.

Examples of the material of the first constraining layer 22 include metals and glass fibers. Examples of the metals include aluminum and copper. As the metal, aluminum is preferable. As the glass fiber, a resin-impregnated fiberglass cloth is preferable.

(2) Vibration-Damping Material

The vibration-damping material 3 as illustrated in FIG. 1 and FIG. 2 is a material for suppressing the vibration of the object P. The vibration-damping material 3 has a sheet shape. The vibration-damping material 3 is disposed on the reinforcing material 2 in the thickness direction. The vibration-damping material 3 is disposed on the first constraining layer 22 in the thickness direction. The vibration-damping material 3 is disposed on the opposite side to the first resin layer 21 with respect to the first constraining layer 22 in the thickness direction.

The first portion P1 overlaps the reinforcing material 2 in the thickness direction. The first portion P1 is in contact with the reinforcing material 2. The first portion P1 is in contact with the first constraining layer 22.

The second portion P2 does not overlap the reinforcing material 2 in the thickness direction. In the present embodiment, the second portion P2 protrudes beyond an edge of the reinforcing material 2 in a direction orthogonal to the thickness direction.

The vibration-damping material 3 has a second resin layer 31 and a second constraining layer 32.

(2-1) Second Resin Layer

The second resin layer 31 has a predetermined thickness in the thickness direction. The second resin layer 31 has a first surface S11 and a second surface S12 in the thickness direction.

The second resin layer 31 has a thickness of, for example, 0.5 mm or more, and, for example, 6.0 mm or less, preferably 3.0 mm or less.

The second resin layer 31 of the first portion P1 is disposed on the first constraining layer 22 in the thickness direction. The second resin layer 31 of the first portion P1 is in contact with the first constraining layer 22. The second resin layer 31 of the first portion P1 adheres to the first constraining layer 22 by the adhesion of the second resin layer 31.

In detail, the second resin layer 31 consists of a second resin composition containing a butyl rubber.

The content of the butyl rubber in the second resin layer 31 (second resin composition) is, for example, 5% by mass or more, preferably 10% by mass or more, more preferably 20% by mass or more, and, for example, 50% by mass or less, preferably 30% by mass or less.

In addition to the above-described component, the second resin composition preferably contains a softener, a tackifier resin, and a filler.

(2-1-1) Softener

The softener gives plasticity to the second resin layer 31.

Examples of the softener include liquid rubbers such as polybutene, liquid isoprene rubber, and liquid butadiene rubber, oils such as paraffinic oil and naphthenic oil, and esters such as phthalate ester and phosphate ester.

As the softener, a liquid rubber is preferable, and polybutene is more preferable.

To 100 parts by mass of the butyl rubber, a blending ratio of the softener is, for example, 30 parts by mass or more, preferably 40 parts by mass or more, more preferably 50 parts by mass or more, and, for example, 90 parts by mass or less, preferably 85 parts by mass or less, more preferably 80 parts by mass or less.

(2-1-2) Tackifier Resin

The tackifier resin gives adhesion to the second resin layer 31, similarly to the above-described tackifier resin of the reinforcing material 2.

Examples of the tackifier resin include the same tackifier resins cited above as the tackifier resins of the reinforcing material 2. As the tackifier resin of the vibration-damping material 3, an aliphatic petroleum resin is preferable.

To 100 parts by mass of the butyl rubber, a blending ratio of the tackifier resin is, for example, 5 parts by mass or more, preferably 10 parts by mass or more, more preferably 50 parts by mass or more, and, for example, 150 parts by mass or less, preferably 90 parts by mass or less.

(2-1-3) Filler

Examples of the filler include the same fillers cited above as the fillers of the reinforcing material 2. As the filler of the vibration-damping material 3, calcium carbonate and carbon black are preferable, and heavy calcium carbonate and carbon black are more preferable.

To 100 parts by mass of the butyl rubber, a blending ratio of the filler is, for example, 100 parts by mass or more, preferably 150 parts by mass or more, more preferably 200 parts by mass or more, and, for example, 350 parts by mass or less, preferably 250 parts by mass or less.

(2-2) Second Constraining Layer

The second constraining layer 32 is disposed on the second surface S12 of the second resin layer 31 in the thickness direction. The second constraining layer 32 constrains a vibration-damping layer 51 described below (see FIG. 3B). The second constraining layer 32 constrains the vibration-damping layer 51, thereby improving the toughness of the vibration-damping layer 51. The second constraining layer 32 has a predetermined thickness in the thickness direction.

The second constraining layer 32 has a thickness of, for example, 0.05 mm or more, preferably 0.1 mm or more, and, for example, 2.0 mm or less, preferably 1.0 mm or less.

Examples of the material of the second constraining layer 32 include the same materials cited above as the materials of the first constraining layer 22.

(3) Release Sheet

The release sheet R is disposed on the first surface S1 of the first resin layer 21 and on the first surface S11 of the second resin layer 31 of the second portion. The release sheet R protects the first resin layer 21 and the second resin layer 31 of the second portion while being disposed on the first surface S1 of the first resin layer 21 and on the first surface S11 of the second resin layer 31 of the second portion. The release sheet R can be released from the first resin layer 21 and the second resin layer 31 of the second portion. As the release sheet R, for example, a known release paper is used.

2. Attachment Method

Next, a method for attaching the reinforcing vibration-damping material 1 to the object P is described.

Figure 3A:
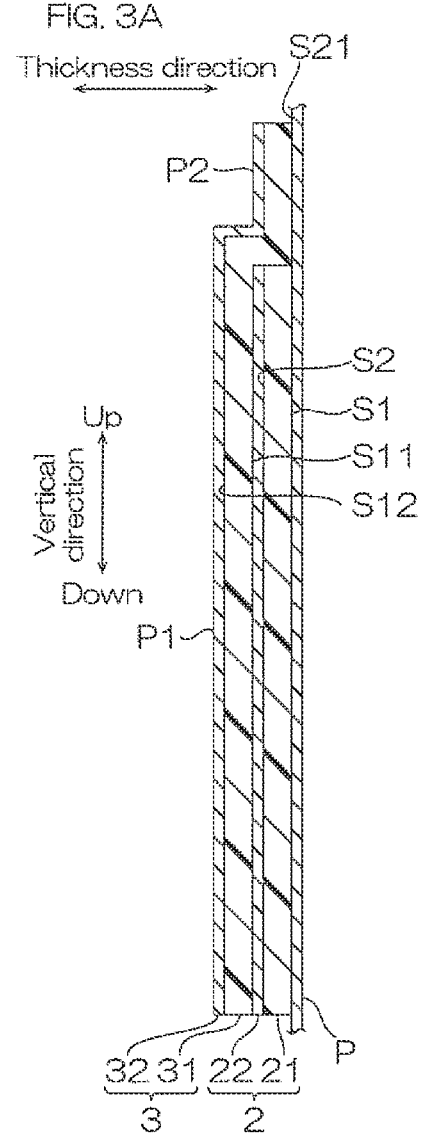
FIGS. 3A and 3B are explanation views illustrating a method for reinforcing the object and damping the vibration of the object with the reinforcing vibration-damping material of FIG. 1.
Figure 3B:
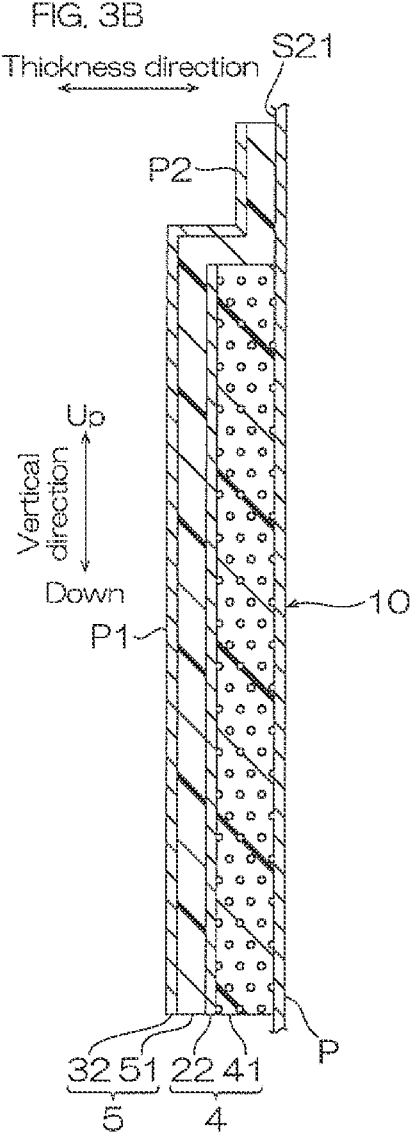

As illustrated in FIG. 3A and FIG. 3B, the attachment method includes an adhering step (see FIG. 3A), and a curing step for curing the first resin layer 21 and second resin layer 31 by heating while the reinforcing vibration-damping material 1 is attached to the object P (see FIG. 3B).

As illustrated in FIG. 3A, the object P has a surface S21 extending in a vertical direction.

In the adhering step, an operator makes the reinforcing vibration-damping material 1 adhere to the object P. In detail, the reinforcing vibration-damping material 1 is adhered to the object P so that the second portion P2 is disposed above the reinforcing material 2. The operator brings the first surface S1 of the first resin layer 21 into contact with the surface S21 of the object P, and brings the first surface S11 of the second resin layer 31 of the second portion P2 into contact with the surface S21 of the object P.

In this manner, the reinforcing vibration-damping material 1 adheres to the object P by the adhesive force of the first resin layer 21 and the adhesive force of the second resin layer 31. In this state, the thickness direction is orthogonal to the vertical direction.

Next, in the curing step, the operator heats the object P to which the reinforcing vibration-damping material 1 is adhered.

The object P is heated at a heating temperature of, for example, 140° C. or more, preferably 160° C. or more, and, for example, 220° C. or less, preferably 200° C. or less.

The object P is heated for a heating time of, for example, 5 minutes or more, preferably 10 minutes or more, and, for example, 60 minutes or less, preferably 30 minutes or less.

At the time, the first resin layer 21 is softened by heating in the curing step. The softening of the first resin layer 21 and the weight of the vibration-damping material 3 may displace the reinforcing material 2 downward. Especially, when the first resin layer 21 contains a foaming agent, the reinforcing material 2 is more likely to displace downward.

However, in this embodiment, the first portion P1 of the vibration-damping material 3 is adhered to the reinforcing material 2 and the second portion P2 of the vibration-damping material 3 is adhered to the object P. Thus, while the reinforcing vibration-damping material 1 of the present embodiment is adhered to the object P, the vibration-damping material 3 holds the reinforcing material 2. This can suppress the downward displacement (heat drooping) of the reinforcing material 2. As a result, the reinforcing vibration-damping material 1 of the present embodiment can be maintained at a desired location.

Specifically, the amount of the downward displacement (the amount of heat drooping) of the reinforcing material 2 can be suppressed to, for example, less than 3 mm, preferably less than 2 mm. When the heat drooping amount is less than the above-described upper limit, the reinforcement member 4 and vibration-damping member 5 are accurately disposed at the parts requiring reinforcement and vibration-damping, and thus both of the reinforcement performance and the vibration-damping performance can further be improved.

As illustrated in FIG. 3A and FIG. 3B, the first resin layer 21 is cured. When the first resin layer 21 contains a foaming agent, the first resin layer 21 is foamed and cured. When the first resin layer 21 contains a foaming agent, an expansion ratio (the thickness of the reinforcement layer 41/the thickness of the first resin layer 21) is, for example, twice or more, preferably 3 times or more, and, for example, 10 times or less.

The curing of the first resin layer 21 forms the reinforcement layer 41. In other words, the reinforcement layer 41 is made of a cured product of the first resin layer 21. When the first resin layer 21 contains a foaming agent, the reinforcement layer 41 is a foamed material. The curing of the first resin layer 21 of the reinforcing material 2 forms the reinforcement member 4 including the reinforcement layer 41 and the first constraining layer 22. The reinforcement member 4 is disposed on the surface S21 of the object P in the thickness direction and reinforces the object P. The reinforcement layer 41 is disposed on the surface S21 of the object P in the thickness direction. The reinforcement member 4 is fixed to the object P by the reinforcement layer 41. The first constraining layer 22 is disposed on the reinforcement layer 41 in the thickness direction.

The vibration-damping material 3 becomes the vibration-damping member 5 without any change. In other words, the vibration-damping member 5 is disposed on a surface of the reinforcement member 4 in the thickness direction to suppress the vibration of the object P. The vibration-damping member 5 has the first portion P1 and the second portion P2. The second portion P2 is disposed on the surface S21 of the object P in the thickness direction. The second portion P2 protrudes upward beyond an upper edge of the reinforcement member 4 in the vertical direction. The vibration-damping member 5 includes the vibration-damping layer 51 and the second constraining layer 32. The vibration-damping layer 51 is made of the second resin layer 31. The vibration-damping layer 51 is disposed on the first constraining layer 22 in the thickness direction. The second constraining layer 32 is disposed on the vibration-damping layer 51 in the thickness direction.

By completing the curing step, the reinforcing vibration-damping structure 10 including the object P, the reinforcement member 4, and the vibration-damping member 5 is formed as illustrated in FIG. 3B.

3. Operations and Effects (1) The reinforcing vibration-damping material 1 includes the reinforcing material 2 and the vibration-damping material 3 as illustrated in FIG. 1 and FIG. 2.

Thus, as illustrated in FIG. 3A and FIG. 3B, the reinforcing material 2 reinforces the object P and, the vibration-damping material 3 can suppress the vibration of the object P.

As a result, both of the reinforcement performance and the vibration-damping performance can be improved.

As illustrated in FIG. 3A, when the reinforcing vibration-damping material 1 is attached to the object P, the reinforcing material 2 is adhered to the object P and the second portion P2 of the vibration-damping material 3 can be adhered to the object P.

Thus, the downward displacement of the reinforcing material 2 is suppressed by the vibration-damping material 3.

As a result, the downward displacement of the reinforcing vibration-damping material 1 is suppressed and thus the reinforcing vibration-damping material 1 can be maintained at a desired location.

(2) In the reinforcing vibration-damping material 1, as illustrated in FIG. 2, the second portion P2 protrudes beyond an edge of the reinforcing material 2 in a direction orthogonal to the thickness direction.

Thus, as illustrated in FIG. 3A, the second portion P2 of the vibration-damping material 3 can easily be adhered to the object P.

(3) In the reinforcing vibration-damping material 1, as illustrated in FIG. 2, the reinforcing material 2 includes the first resin layer 21 and the first constraining layer 22 disposed on the first resin layer 21, and the vibration-damping material 3 includes the second resin layer 31 disposed on the first constraining layer 22 and the second constraining layer 32 disposed on the second resin layer 31.

Thus, the first constraining layer 22 can constrain the first resin layer 21 and the second constraining layer 32 can constrain the second resin layer 31.

In this manner, the shapes of the first resin layer 21 and second resin layer 31 are maintained, and the handleability of the reinforcing vibration-damping material 1 can be improved.

(4) In the reinforcing vibration-damping structure 10, as illustrated in FIG. 3B, the reinforcement member 4 is disposed on the object P, and the vibration-damping member 5 is disposed on the reinforcement member 4. This allows for the reinforcement of the object P with the reinforcement member 4 and the suppression of the vibration of the object P with the vibration-damping member 5.

As a result, both of the reinforcement performance and the vibration-damping performance can be improved.

The reinforcement member 4 is disposed on the object P and the second portion P2 of the vibration-damping member 5 is disposed on the object P.

Thus, the vibration-damping member 5 allows the reinforcement member 4 to be attached to the object P without the downward displacement. In this manner, the reinforcement member 4 and the vibration-damping member 5 can be maintained at desired locations.

As a result, the reinforcement member 4 and the vibration-damping member 5 are accurately disposed at the parts of the object P that require reinforcement and vibration-damping, and thus both of the reinforcement performance and the vibration-damping performance can further be improved.

(5) In the reinforcing vibration-damping structure 10, as illustrated in FIG. 3B, the second portion P2 protrudes upward beyond the upper edge of the reinforcement member 4 in the vertical direction.

Thus, the second portion P2 can suppress the downward displacement of the reinforcement member 4 in a simple structure.

(6) In the reinforcing vibration-damping structure 10, as illustrated in FIG. 3B, the reinforcement member 4 includes the reinforcement layer 41 disposed on the object P and the first constraining layer 22 disposed on the reinforcement layer 41, and the vibration-damping member 5 includes the vibration-damping layer 51 disposed on the first constraining layer 22 and the second constraining layer 32 disposed on the vibration-damping layer 51.

Thus, the first constraining layer 22 can give toughness to the reinforcement layer 41 and improve the reinforcement performance.

Further, the second constraining layer 32 can give toughness to the vibration-damping layer 51 and can also improve the vibration-damping performance.

(7) In the reinforcing vibration-damping structure 10, as illustrated in FIG. 3B, the reinforcement layer 41 is a foamed material.

Figure 4:
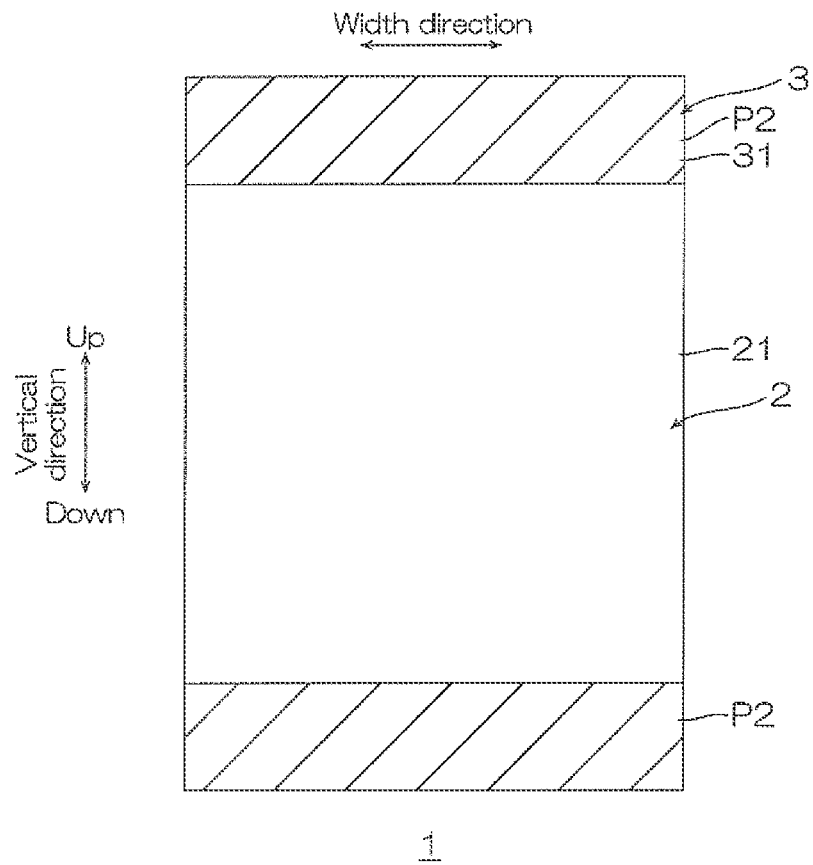
FIG. 4 is an explanation view illustrating the first variation.

Thus, the increased thickness of the reinforcement layer 41 can improve the reinforcement performance 4. Variations (1) The location of the second portion P2 in relation to the reinforcing material 2 is not limited. For example, the second portion P2 may be disposed at an upper side and a lower side of the reinforcing material 2 as illustrated in FIG. 4 while the reinforcing vibration-damping material 1 is adhered to the surface S21 of the object P.

Figure 5:
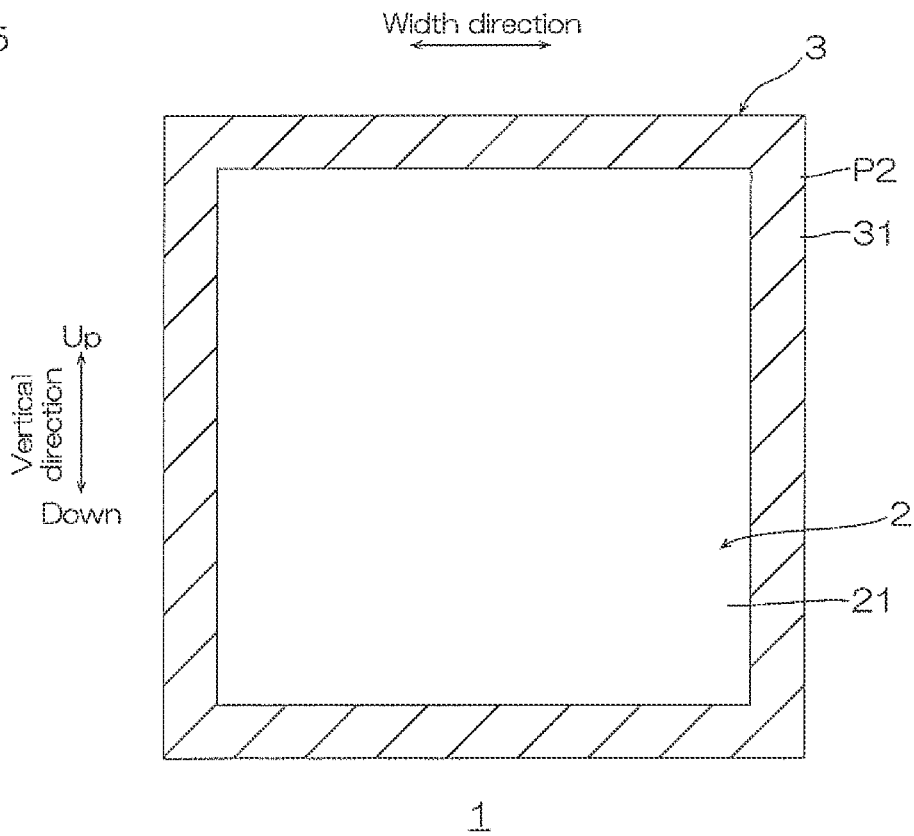
FIG. 5 is an explanation view illustrating the second variation.

Alternatively, as illustrated in FIG. 5, the second portion P2 may be disposed at the whole of the periphery of the reinforcing material 2.

Figure 6:
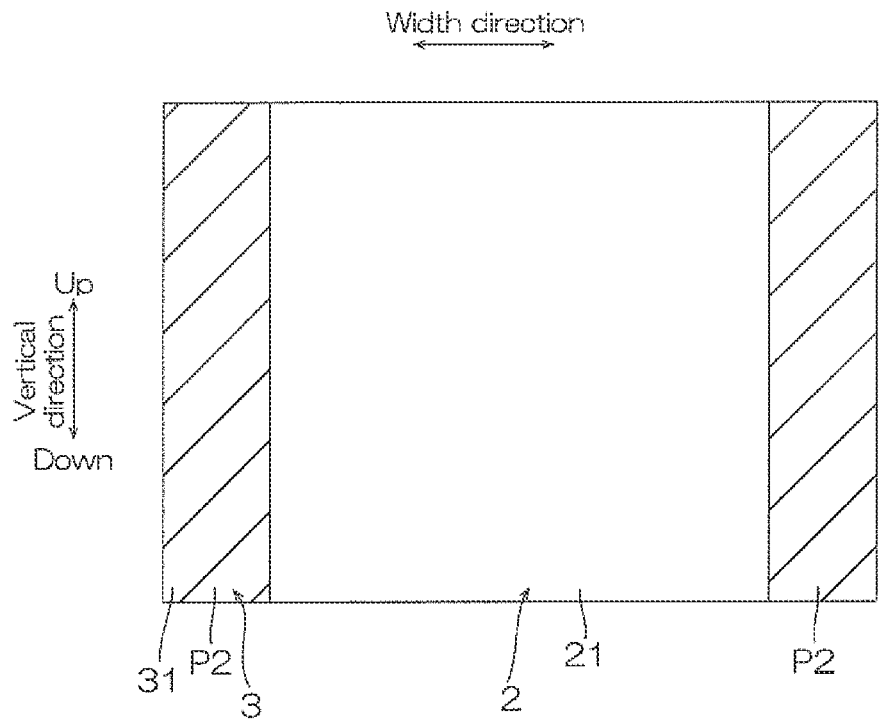
FIG. 6 is an explanation view illustrating the third variation.

Alternatively, as illustrated in FIG. 6, the second portion P2 may be disposed at both sides in a width direction of the reinforcing material 2. The width direction is orthogonal to the vertical direction and the thickness direction. This variation demonstrates that the second portions P2 protrude beyond the edges of the reinforcement member 4 in the width direction while the first resin layer 21 is cured.

This variation also provides a simple structure in which the second portion P2 can suppress the downward displacement of the reinforcement member 4.

Figure 7:
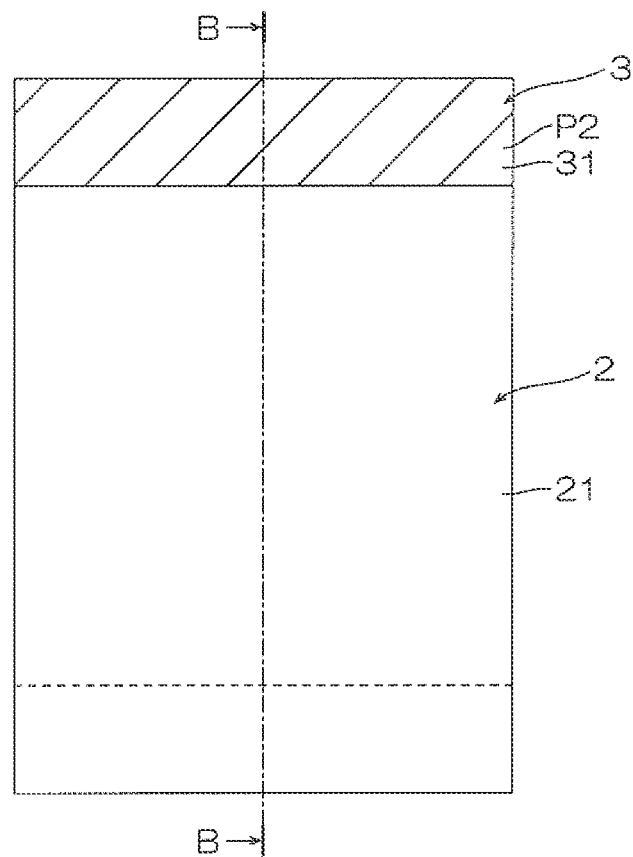
FIG. 7 is an explanation view illustrating the fourth variation.
Figure 8:
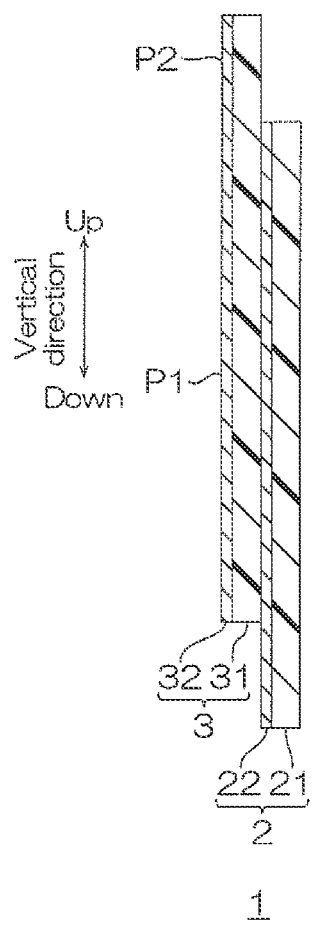
FIG. 8 is a cross-sectional view taken along line B-B of FIG. 7.

As illustrated in FIG. 7 and FIG. 8, the vibration-damping material 3 may expose a part of the reinforcing material 2 to a degree that does not decrease the vibration-damping performance.

Figure 9:
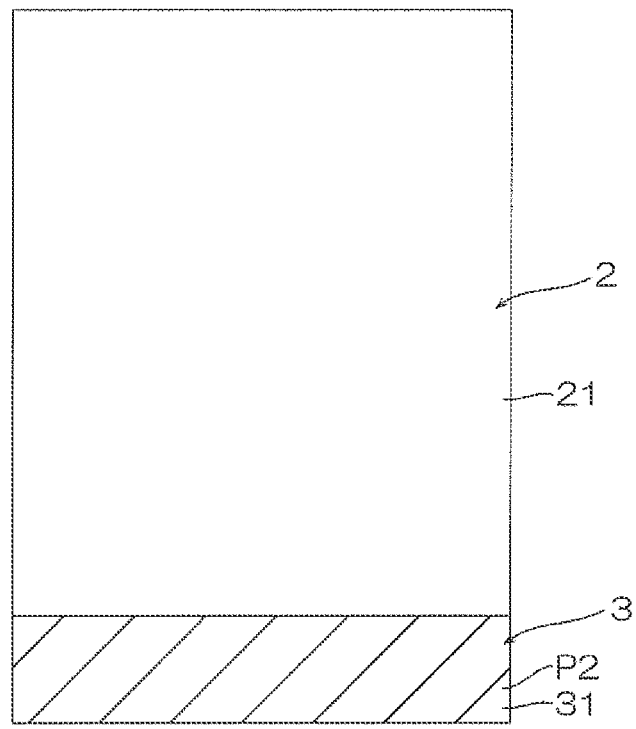
FIG. 9 is an explanation view illustrating the fifth variation.

As illustrated in FIG. 9, the second portion P2 may be disposed at a lower side with respect to the reinforcing material 2.

Figure 10:
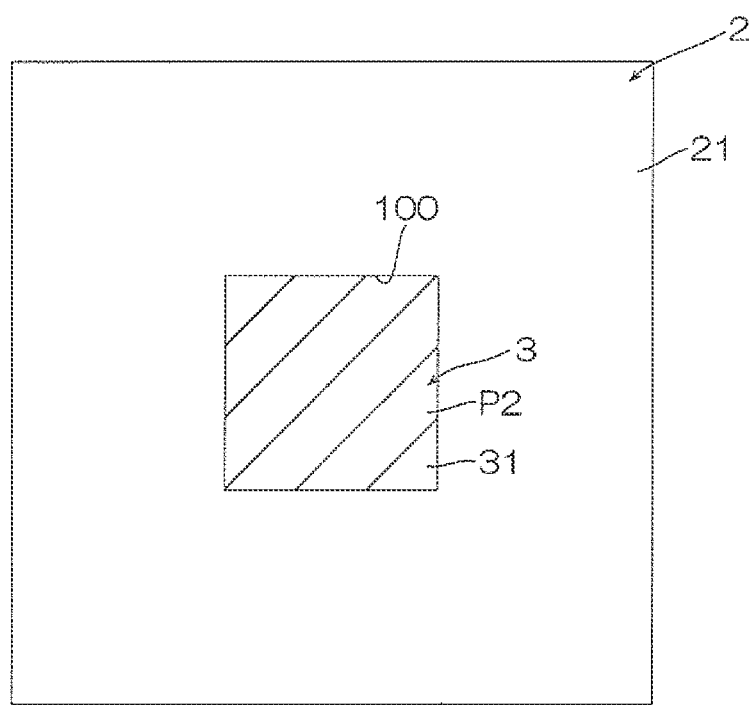
FIG. 10 is an explanation view illustrating the sixth variation.

As illustrated in FIG. 10, the second portion P2 may be disposed in a penetrating hole 100 formed in the reinforcing material 2.

(2) The reinforcing vibration-damping material 1 may not include the second constraining layer 32. The reinforcing vibration-damping material 1 may include the vibration-damping material 3 made of only the second resin layer 31.

(3) The shape of the reinforcing material 2 is not limited. The reinforcing material 2 may have, for example, an oval shape, a rectangular shape, and a wavy shape (including a rectangular shape having two wavy opposite sides). Similarly, the shape of the vibration-damping material 3 is not limited. The reinforcing material 2 may also have, for example, an oval shape, a rectangular shape, and a wavy shape (including a rectangular shape having two wavy opposite sides). The shape of the vibration-damping material 3 may differ from that of the reinforcing material 2.

(4) The second portion P2 may not form a side of the vibration-damping material 3. For example, the second portion P2 may protrude from a part of a side of the vibration-damping material 3. The protruding second portion P2 has a smaller width than that of the vibration-damping material 3.

More specifically, each second portion P2 may protrude from each of the upper side and lower side of the vibration-damping material 3. Alternatively, each second portion P2 may protrude from each of the one side and the other side in the width direction of the vibration-damping material 3. Alternatively, two or more second portions P2 may protrude from a side of the vibration-damping material 3.

EXAMPLES

Next, the present invention is described with reference to Examples and Comparative Examples. The present invention is not limited to the following Examples. The specific numeral values used in the description below, such as physical property values and parameters, can be replaced with the corresponding physical property values and parameters in the above-described "DESCRIPTION OF THE EMBODIMENT", including the upper limit values (numeral values defined with "or less", and "less than") or the lower limit values (numeral values defined with "or more", and "more than").

1. Description of Material
<Material of First Resin Layer>
(1) Thermosetting Resin
Bisphenol A type epoxy resin (an epoxy equivalent of 230 to 270 g/eq, manufactured by Mitsubishi Chemical Holdings Corporation, "jER 834") 50 parts by mass
Hydrogenated bisphenol A type epoxy resin (an epoxy equivalent of 215 g/eq, manufactured by ADEKA CORPORATION, "EP-4080E") 10 parts by mass
(2) Diene Rubber
Styrene-butadiene rubber (manufactured by Asahi Kasei Chemicals, "TUFDENE") 40 parts by mass
(3) Tackifier Resin
Aliphatic-aromatic copolymerized petroleum resin (manufactured by Tosoh Corporation, "Petrotack 90HM") 40 parts by mass
(4) Vulcanizing Agent
Sulfur (manufactured by Tsurumi Chemical Industry Co., ltd., "GOLDEN FLOWER SULFUR POWDER") 35 parts by mass
(5) Vulcanization Accelerator
Thiazole vulcanization accelerator (manufactured by OUCHI SHINKO CHEMICAL INDUSTRIAL CO., LTD., "NOCCELER DM") 10 parts by mass
(6) Thermosetting Resin Curing Agent
Dicyandiamide (manufactured by NIPPON CARBIDE INDUSTRIES CO., INC.) 5 parts by mass
(7) Foaming Agent
4,4'-oxybis (benzene sulfonyl hydrazide) (OBSH) (manufactured by EIWA CHEMICAL IND. CO., LTD., "Neocellborn N #1000S") 2 parts by mass
(8) Filler
Heavy calcium carbonate (manufactured by Maruo Calcium Co., Ltd.) 100 parts by mass
Carbon black (manufactured by Asahi Carbon Co., Ltd., "Asahi #50") 3 parts by mass
<Material of Second Resin Layer>
(1) Butyl Rubber
S butyl recycled rubber (manufactured by Agata Rubber Industry Co., Ltd.) 100 parts by mass
(2) Softener
Liquid polybutene (manufactured by JX NIPPON OIL & ENERGY CORPORATION, "polybutene HV-15") 70 parts by mass
(3) Tackifier Resin
Aliphatic petroleum resin (manufactured by Exxon Mobil Corporation, "Escorez 1202") 70 parts by mass (4) Filler
Heavy calcium carbonate (manufactured by Maruo Calcium Co., Ltd.) 170 parts by mass
Carbon black (manufactured by Asahi Carbon Co., Ltd., "Asahi #50") 50 parts by mass 2. Production of Reinforcing Vibration-Damping Material Example 1

The above-described materials (1) to (8) of the first resin layer were mixed, thereby preparing a first resin composition. The prepared first resin composition was extended to a thickness of 1.0 mm by application of pressure by a mold press machine, thereby producing a first resin layer. A resin-impregnated glass cloth with a thickness of 0.2 mm was adhered as a first constraining layer to a one-side surface of the produced first resin layer. In this manner, a reinforcing material was produced.

Next, the above-described materials (1) to (4) of the second resin layer were mixed, thereby preparing a second resin composition. The prepared second resin composition was extended to a thickness of 2.0 mm by application of pressure by a mold press machine, thereby producing a second resin layer. A resin-impregnated glass cloth with a thickness of 0.2 mm was adhered as a second constraining layer to a one-side surface of the produced second resin layer. In this manner, a vibration-damping material was produced.

Next, as illustrated in FIG. 1 and FIG. 2, the vibration-damping material was adhered to the first constraining layer of the reinforcing material.

In this manner, a reinforcing vibration-damping material was produced.

Example 2

A reinforcing vibration-damping material was produced in the same manner as Example 1 except that the vibration-damping material was adhered to the first constraining layer of the reinforcing material as illustrated in FIG. 7.

Example 3

A reinforcing vibration-damping material was produced in the same manner as Example 1 except that the vibration-damping material was adhered to the first constraining layer of the reinforcing material as illustrated in FIG. 6.

Example 4

A reinforcing vibration-damping material was produced in the same manner as Example 1 except that the vibration-damping material was adhered to the first constraining layer of the reinforcing material as illustrated in FIG. 5.

Example 5

A reinforcing vibration-damping material was produced in the same manner as Example 1 except that the vibration-damping material was adhered to the first constraining layer of the reinforcing material as illustrated in FIG. 9.

Comparative Example 1

Only a reinforcing material was produced in the same manner as Example 1 without producing a vibration-damping material.

Comparative Example 2

Only a vibration-damping material was produced in the same manner as Example 1 without producing a reinforcing material.

Comparative Example 3

A reinforcing vibration-damping material was produced in the same manner as Example 1 except that a vibration-damping material in the same size as the reinforcing material was adhered to the first constraining layer of the reinforcing material so that the vibration-damping material does not protrude beyond the reinforcing material.

3. Production of Test Piece and Evaluation of Heat Drooping

The reinforcing vibration-damping material produced in each of Examples and Comparative Examples (the reinforcing material in Comparative Example 1, and the vibration-damping material in Comparative Example 2) was adhered to a (thin) test steel plate with a thickness of 0.8 mm, a width of 10 mm, and a length of 250 mm.

Next, as illustrated in FIG. 3A, the test steel plate was disposed to extend along the vertical direction and was heated at 180° C. for 20 minutes.

In this manner, the first resin layer of the reinforcing material is foamed and cured, thereby producing a test piece (see FIG. 3B). Then, the amount of downward displacement (heat drooping amount) of the reinforcing material at the heating was measured. Tables 1 and 2 show the results.

4. Evaluation of Reinforcement Performance

The reinforcement performance of the produced test piece was evaluated using a tensile and compression testing machine Technograph TG-5KN (manufactured by MinebeaMitsumi Inc.).

In detail, the testing machine supported the test piece at an interval of 100 mm in a state in which the test steel plate was on top. Then, the test bar was dropped from above to the longitudinal center of the test piece at a speed of 1 mm/min.

The bending strength of a 1-mm displacement of the reinforcement layer after the contact of the test bar with the test steel plate was evaluated as the reinforcement performance Tables 1 and 2 show the results.

5. Evaluation of Vibration-Damping Performance

The loss factor of a second resonance point of the produced test piece at 20° C. was measured by a central exciting method according to JIS K 7391. Tables 1 and 2 show the results.

TABLE 1

|  | Example 1 | Example 2 | Example 3 | Example 4 | Example 5 |
|---|---|---|---|---|---|
| Thickness of reinforcing material (mm) | 1.2 | 1.2 | 1.2 | 1.2 | 1.2 |
| Thickness of vibration-damping material (mm) | 2.2 | 2.2 | 2.2 | 2.2 | 2.2 |
| Total thickness (mm) | 3.4 | 3.4 | 3.4 | 3.4 | 3.4 |
| Amount of heat drooping (mm) | <2.0 | <2.0 | <2.0 | <2.0 | 2.52 |
| Bending strength (N) | 43 | 43 | 43 | 43 | 43 |
| Loss factor | 0.31 | 0.31 | 0.31 | 0.31 | 0.31 |

TABLE 2

|  | Comparative Example 1 | Comparative Example 2 | Comparative Example 3 |
|---|---|---|---|
| Thickness of reinforcing material (mm) | 1.2 | — | 1.2 |
| Thickness of vibration-damping material (mm) | — | 2.2 | 2.2 |
| Total thickness (mm) | 1.2 | 2.2 | 3.4 |
| Amount of heat drooping (mm) | <2.0 | <2.0 | 3.2 |
| Bending strength (N) | 43 | 9 | 43 |
| Loss factor | 0.02 | 0.30 | 0.31 |

While the illustrative embodiments of the present invention are provided in the above description, such is for illustrative purpose only and it is not to be construed as limiting in any manner Modification and variation of the present invention that will be obvious to those skilled in the art is to be covered by the following claims.

INDUSTRIAL APPLICABILITY

The reinforcing vibration-damping material and reinforcing vibration-damping structure of the present invention are used for reinforcing and damping the metal panels used for, for example, transports such as automobiles, railway vehicles, vessels, and airplanes, or buildings.

DESCRIPTION OF REFERENCE NUMERALS 1 reinforcing vibration-damping material
2 reinforcing material
3 vibration-damping material
4 reinforcement member
5 vibration-damping member
21 first resin layer
22 first constraining layer
31 second resin layer
32 second constraining layer
41 reinforcement layer
51 vibration-damping layer
P object
P1 first portion
P2 second portion

The invention claimed is:

1. A reinforcing vibration-damping material comprising:
a reinforcing material; and
a vibration-damping material disposed on the reinforcing material in a thickness direction of the reinforcing material,
wherein the vibration-damping material has a first portion that overlaps the reinforcing material in the thickness direction, and a second portion that does not overlap the reinforcing material in the thickness direction,
wherein the reinforcing material has a first resin layer and a first constraining layer disposed on the first resin layer in the thickness direction, and
wherein the vibration-damping material has a second resin layer disposed on the first constraining layer in the thickness direction and a second constraining layer disposed on the second resin layer in the thickness direction.

2. The reinforcing vibration-damping material according to claim 1, wherein the second portion protrudes beyond an edge of the reinforcing material in a direction orthogonal to the thickness direction.

3. The reinforcing vibration-damping material according to claim 1, wherein
the first resin layer contains a thermosetting resin, and
the second resin layer contains a butyl rubber.

4. The reinforcing vibration-damping material according to claim 1, wherein
the first resin layer further contains a foaming agent.

5. A reinforcing vibration-damping structure comprising:
an object;
a reinforcement member disposed on the object and reinforcing the object; and
a vibration-damping member disposed on the reinforcement member in a thickness direction of the reinforcement member to suppress vibration of the object,
wherein the vibration-damping member has a first portion that overlaps the reinforcement member in the thickness direction and a second portion that does not overlap the reinforcement member in the thickness direction and is disposed on the object in the thickness direction,
wherein the reinforcement member has a reinforcement layer disposed on the object in the thickness direction and a first constraining layer disposed on the reinforcement layer in the thickness direction,
wherein the vibration-damping member has a vibration-damping layer disposed on the first constraining layer in the thickness direction and a second constraining layer disposed on the vibration-damping layer in the thickness direction,
wherein the reinforcement layer is a cured product of the first resin layer containing a thermosetting resin, and
wherein the vibration-damping layer is made of a second resin layer containing a butyl rubber.

6. The reinforcing vibration-damping structure according to claim 5, wherein
the object has a surface extending in a vertical direction,
the reinforcement member is disposed on the surface of the object in the thickness direction orthogonal to the vertical direction, and
the second portion protrudes upward beyond an upper edge of the reinforcement member in the vertical direction.

7. The reinforcing vibration-damping structure according to claim 5, wherein
the object has a surface extending in a vertical direction,
the reinforcement member is disposed on the surface of the object in the thickness direction orthogonal to the vertical direction, and
the second portion protrudes beyond an edge of the reinforcement member in a width direction orthogonal to both of the vertical direction and the thickness direction.

8. The reinforcing vibration-damping structure according to claim 5, wherein
the reinforcement layer is a foamed material.

\* \* \* \* \*